Feb. 2, 1965  G. E. GERMANN  3,168,059
PRODUCT DISPENSING DEVICE
Filed April 11, 1963  2 Sheets-Sheet 1

INVENTOR.
GEORGE E GERMANN
BY Robert B. Hughes

ATTORNEY

Feb. 2, 1965   G. E. GERMANN   3,168,059
PRODUCT DISPENSING DEVICE
Filed April 11, 1963   2 Sheets-Sheet 2

INVENTOR.
GEORGE E. GERMANN
BY *Robert B. Hughes*
ATTORNEY

United States Patent Office 3,168,059
Patented Feb. 2, 1965

3,168,059
PRODUCT DISPENSING DEVICE
George E. Germann, Minneapolis, Minn., assignor to General Mills, Inc., a corporation of Delaware
Filed Apr. 11, 1963, Ser. No. 272,410
4 Claims. (Cl. 107—14)

This invention relates to a product dispensing apparatus, and more particularly to such apparatus as applied to a pressurized dispensing can for cookie dough and the like, whereby said dough is in one operation discharged directly from said can and formed into a desired cookie shape preparatory to baking.

The domestic art of making cookies in a variety of shapes and sizes has long been accomplished through the use of a familiar apparatus, the manual cookie press. This prior art device comprises a dough containing cylinder having a plunger which is manually operated by a screw drive. To use the manual cookie press, a cap is first unscrewed from the discharge end of the cylinder, a plate or tip inserted into the cap, and the cap then replaced. A cover at the infeed end of the cylinder is removed, and previously prepared dough of proper consistency is then packed firmly and carefully into the cookie press cylinder. This cover with the plunger is replaced and the press is ready for use. The operator then stands the press on a cookie sheet, and while holding it in an upright position, turns the plunger handle to force dough through the plate until a cookie is formed. The cookie press is then lifted, and the cookie will "cut off."

It is an object of the present invention to provide an especially simple and convenient dispensing and forming apparatus, wherein cookie dough or a similar viscous product is in one operation discharged directly from a pressurized dispensing can and formed in a desired cookie shape on a suitable receiving surface.

It is a more specific object to provide such apparatus having a dispensing attachment which besides serving its dispensing function also serves as a closure cap for said apparatus when in storage.

It is a further specific object to provide such apparatus in which various die members can be used in the apparatus, whereby said dough can be formed into various specific decorative configurations.

Figure 1:
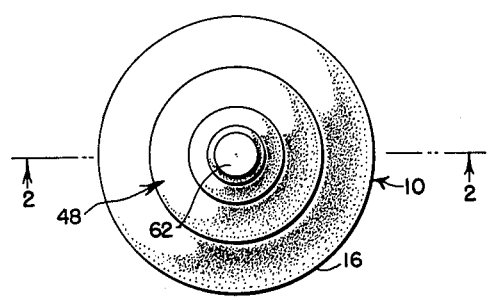
Figure 3:
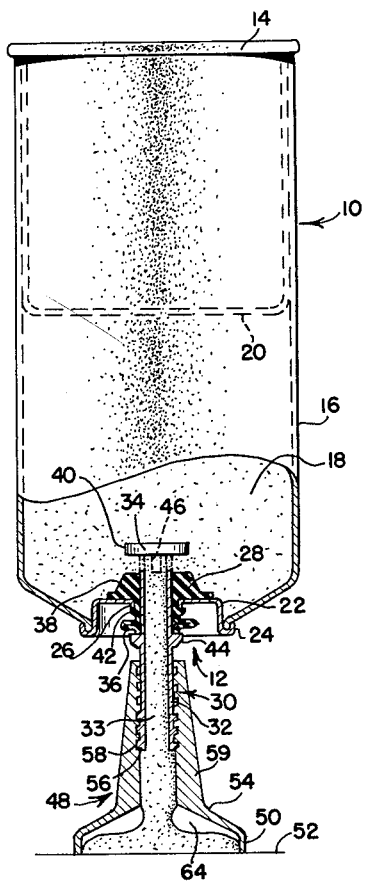
Figure 2:
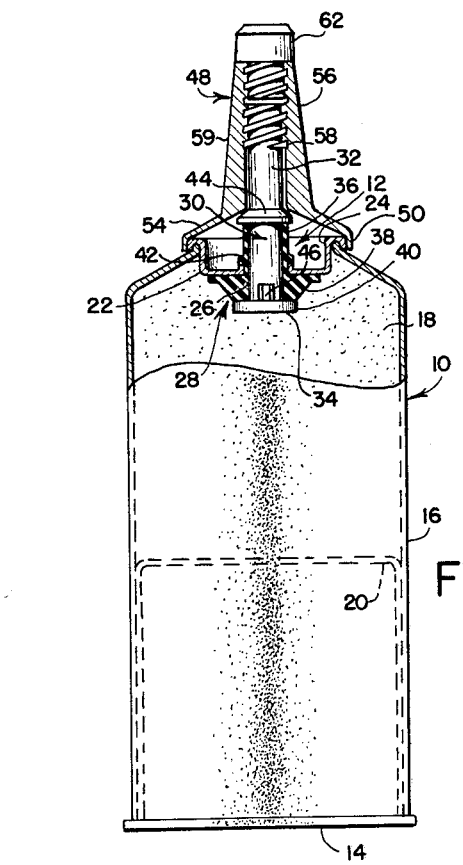

These and other objects and features of the invention will be more readily understood and appreciated from the following detailed description of the preferred embodiments thereof selected for purposes of illustration and shown in the accompanying drawings, in which:

FIGURE 1 is a top plan view of an apparatus embodying preferred teachings of my invention, showing the dispensing attachment of the apparatus serving as a closure cap, FIGURE 2 is a side elevational view taken partly in section on line 2—2 of FIGURE 1, FIGURE 3 is a view similar to that of FIGURE 2, but with the dispensing attachment in its working position, and the apparatus being shown performing its operation of dispensing cookie dough in a desired shape onto a cookie sheet.

Figure 4:
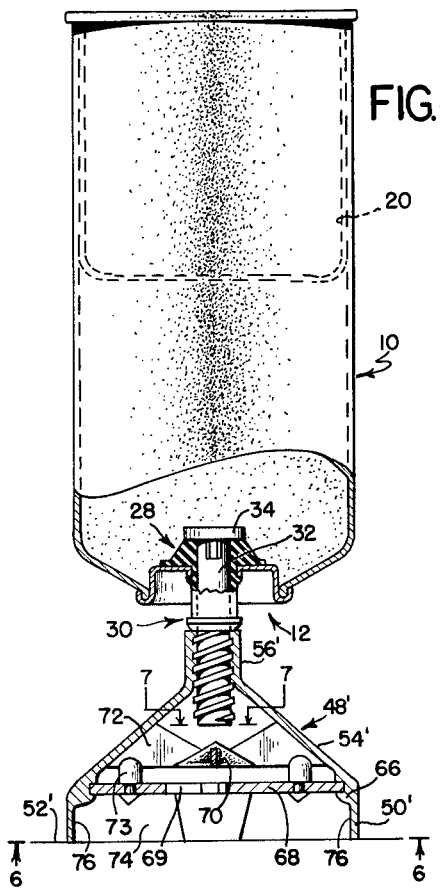
Figure 5:
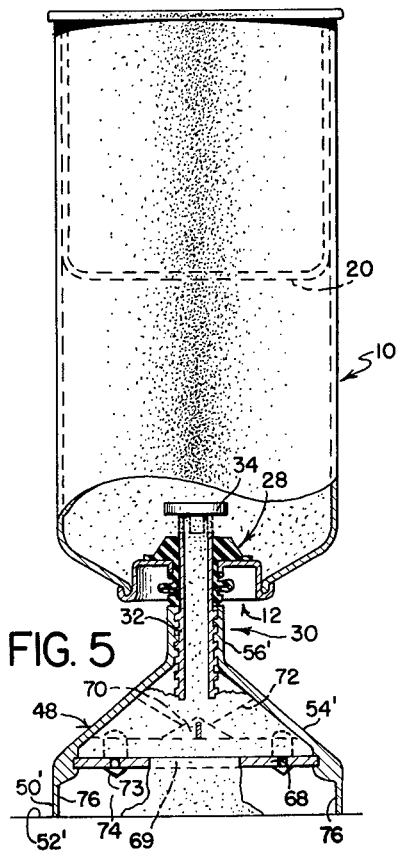
Figure 6:
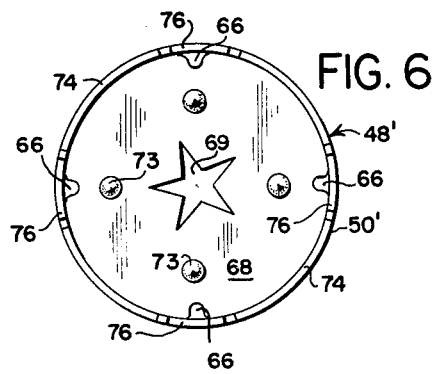
Figure 7:
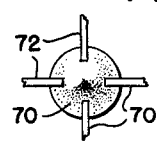

FIGURE 4 is a view similar to that of FIGURE 3, but showing a second embodiment of my invention, with this apparatus in its working position preparatory to dispensing dough, FIGURE 5 is a view similar to FIGURE 4 showing the apparatus of the second embodiment of my invention dispensing dough and forming the same in a specific decorative configuration, FIGURE 6 is a bottom plan view taken on line 6—6 of FIGURE 4, and FIGURE 7 is a horizontal sectional view taken on line 7—7 of FIGURE 4.

A first embodiment of my invention is illustrated in FIGURES 1–3, wherein is shown a pressurized dispensing can 10, having at its upper end a dispensing valve 12 through which dough product is dispensed from within the can 10 in response to opening of valve 12. This can 10 and valve unit 12 shown herein are well known in the prior art, and it is understood that other similar units may be substituted without departing from the teachings of the invention. As shown herein, the can 10 has a base 14 on which it rests when not in use, and a cylindrical side wall 16, which at its upper end reaches inwardly to join to the valve 12. The dough product 18 to be dispensed is stored in the upper portion of the can 10, adjacent the valve 12, while the lower portion of the can 10 is occupied by a piston indicated schematically at 20. This piston can be any one of a number of suitable prior art pistons or other means which function to push the dough product 18 from the can 10 in response to opening of the valve 12, the can containing a suitable propellant, such as a pressurized gas, to press against the piston 20 or other means so that it is able to accomplish this function.

As shown herein, the valve 12 comprises an annular mounting collar 22 crimped at 24 onto the upper end of the can 10 and having a center opening 26 to accommodate a rubber valve seal 28 and a movable valve core member 30. The valve core 30 comprises a vertical tubular stem 32 defining a discharge passage 33, and a base piece 34 closing the bottom of the stem 32. Sleeved onto the lower portion of the stem 32 is the rubber seal 28, the upper end of which is a relatively thin cylindrical portion 36 and the lower end of which is formed as a radially expanded ring portion 38 which is pressed by a peripheral annular flange portion 40 of the core base 34 against the lower side of the mounting collar 22. The cylindrical seal portion 36 is formed with a circumferential lip 42 which, with the lower ring portion 38, forms a circumferential groove to accommodate the inner edge of the mounting collar 22 so as to locate the valve seal in the collar 22. Immediately above the rubber seal 28, there is formed on the stem 32 an annular lip 44 which the upper cylindrical seal portion 36 engages with moderate pressure to urge the valve core 30 upwardly to its closed position.

In the lower end of the valve core 30, proximate the base piece 34, there are formed several openings 46 which lead into the discharge passage 33 formed within the length of the valve stem 32. These openings 46 are normally closed by the seal ring portion 38 of the valve seal 28. However, when the stem 32 is depressed or tilted sideways against the rubber seal portion 36, the valve core base piece 34 draws away from the sealing ring 38, and the valve core openings 46 are exposed to permit dough product 18 to flow from the can 10 out the dispensing stem 32.

My invention provides a dispensing attachment 48, which in the present embodiment serves not only a dough dispensing and forming function but also is used as a closure cap when the apparatus is not in use. It can be seen that the attachment 48 comprises a shallow cylindrical base portion 50, the lower edge of which (as shown in FIGURE 3) is adapted to be pressed against a suitable dough receiving surface, such as a cookie sheet 52, and the upper edge of which joins to a body portion 54 of the attachment 48. This body 54 tapers inwardly and moderately upward (in a frusto-conical configuration) to join to an upstanding interiorly threaded socket forming member 56, by which the attachment 48 is threaded onto the dispensing stem 32, which is formed with exterior threads 58. Several reinforcing webs 59 join to the body portion 54 and to the socket member 56.

When the housewife or other user receives this device from the retailer, the attachment 48 functions as a cover for the valve 12, and, as shown in FIGURE 2, is screwed by its socket member 56 onto the stem 32 with its base portion 50 fitting against the can 10. A suitable plug 62 is provided to close the open end of socket member 56 by threadedly engaging the same.

When it is desired to use the device to make cookies, the plug 62 is taken off the socket member 56, the attachment 48 is removed from the stem 32, inverted, and then threaded back onto the stem 32 so that the body 54 and base 50 extend upwardly and radially outward from the upper end of the stem 32. The can 10 is inverted, the base 50 placed on the cookie sheet 52, and the can 10 is pushed downwardly. This causes the attachment 48 to push the stem 32 against the seal portion 36 and into the can 10 thus exposing the valve openings 46 and permitting dough product 18 to be discharged out the dispensing stem 32. It can be seen that the base 50 and body 54 define with the dough receiving surface 52 a forming cavity 64 into which the product 18 is discharged. As the product 18 strikes the sheet 52, it spreads radially outward to the base 50, with the dough assuming the shape of a flat round cookie. When a proper amount of dough product 18 has been discharged from the can 10 (the operator being able to ascertain this after one or more attempts), the can 10 is lifted from the cookie sheet 52 to close the valve 12 and leave a properly formed portion of cookie dough on the sheet 52. If desired, the attachment 48 can be made transparent to better enable the operator to visually ascertain when a proper amount of dough has been dispensed.

When the housewife or other operator has completed the formation of the desired number of cookies, the can 10 is placed right side up, the attachment 48 is unscrewed from the stem 32, and after an intermediate cleaning is inverted, and then threaded back onto the stem 32. The plug 62 is replaced and the apparatus is stored for future use.

A second embodiment of my invention is illustrated in FIGURES 4 through 7. As can be seen in these figures, there is a dispensing can and a valve assembly identical with those of the first embodiment, and hence these members along with their component parts are given numerical designations identical to their counterparts of the first embodiment. The attachment piece of the present embodiment is somewhat similar to that of the first embodiment, and components thereof similar to those of the first embodiment will be given like numerical designations, with a prime (′) designation distinguishing those of the second embodiment.

This attachment piece 48′ comprises a base 50′ a body 54′ and a socket forming connecting member 56′. That portion of the base 50′ proximate to the body 54′ is provided with a plurality of catch members 66 to receive, as by a snap fit, a decorator plate or die plate 68. This decorator plate 68 is formed with an opening of a decorative design, such as the star configuration 69 illustrated in FIGURE 6, and several such plates 68 can be provided with different decorative patterns. Positioned between the stem 44 and the decorator plate 68 is a suitable dough obstructing or diverting piece 70 provided with a plurality of outstanding webs 72, each of which has a related pin 73 by which the piece 70 is joined to the die plate 68. This obstructing piece 70 serves to divert the dough being discharged from the stem 32 so that it will properly flow through the opening 69 of the die plate 68 and onto the dough receiving pan 52′ so as to form a cookie in the desired shape.

The mode of operation of this second embodiment is quite similar to that of the first embodiment, with the device being positioned so that the base 50′ contacts the cookie pan 52′, and the can 10 being depressed until a suitable charge of dough is dispensed through the die plate 68 onto the pan 52′. As shown herein, the base 50′, while being generally cylindrical, is formed with a plurality of cutouts 74 so as to form several leg members 76. This permits better visual inspection of the amount of dough being discharged onto the pan 52′. Or if desired, this attachment 48 can be made transparent to permit such visual inspection. As in the previous embodiment, this attachment 48′ can also serve as a closure cap.

It is to be understood that this apparatus also readily lends itself to dispensing spread for crackers in an especially convenient manner, so that a tray of fresh appetizers can be quickly made. For such application a group of crackers is arranged on a tray and the spread is discharged onto each of the crackers by locating the dispenser with its attachment base 50 or 50′ around each cracker and pressing the can 10 downwardly to discharge a portion of spread onto each cracker. Thus the base 50 or 50′ serves to locate the cracker as the spread is being dispensed thereon.

What is claimed:

1. An apparatus to dispense a viscous product such as cookie dough or cracker spread, said apparatus comprising: a pressurized dispensing can to contain said product, a valve assembly mounted on one end of said can and having a dispensing stem formed with a discharge end, said dispensing stem being yieldingly held in a closed position and movable by moderate force to a discharge position in which product from said can is dispensed from the discharge end of said stem, a dispensing attachment comprising a connecting portion, a body, and a base, said connecting portion being arranged to interfit with said stem in a manner to locate said attachment in a dispensing position, said base presenting contact means occupying a single plane, said contact means being so arranged that when said attachment is in its dispensing position, said contact means is spaced radially outward from said stem and is spaced from said can beyond the discharge end of said stem, so as to be able to properly engage a contact surface, said attachment defining a forming cavity communicating with the discharge end of said dispensing stem, whereby when said can is manipulated to press said base portion against said surface in a manner to move said stem to its discharge position, a portion of said product is dispensed into said cavity, said attachment having a die member located in said forming cavity, whereby product dispensed from said stem passes through said die to take a predetermined shape as it is discharged from said stem.

2. The apparatus as recited in claim 1, wherein said die is removably secured to said attachment.

3. The apparatus as recited in claim 2, wherein there is an obstructing member located between said die and said stem to divert said product, so that said product properly passes through said die.

4. An apparatus to dispense a viscous product such as cookie dough or cracker spread, said apparatus comprising: a pressurized dispensing can to contain said product, said can having a longitudinal axis; a valve assembly mounted on one end of said can and having a dispensing stem formed with a discharge end, said dispensing stem being exteriorly threaded near its outer end and being longitudinally aligned and generally centrally disposed at the discharge end of said can, said dispensing stem being yieldingly held in a closed position and movable by moderate force toward said cam along a direction generally parallel with said longitudinal axis to a discharge position in which product from said can is dispensed from the discharge end of said stem; a dispensing attachment comprising a connecting portion, a body, and a base, said connecting portion having an interiorly threaded portion which is open at both ends and is disposed in a manner to be able to threadedly engage through one end of said threaded portion said stem in a manner to locate said attachment in a dispensing position at which said connecting portion is, when said dispensing stem is in its closed position, spaced from the dispensing end of said can to permit movement of said dispensing stem toward said can along a direction generally parallel with the longitudinal axis of said can, said base presenting contact means occupying a single plane, said contact means being so arranged that when said attachment is in its dispensing position, said contact means is spaced radially outward from said stem in a generally circular configuration and is spaced from said can beyond the discharge end of said stem, so as to be able to properly engage a contact surface, said attachment defining a forming cavity communicating with the discharge end of said dispensing stem, whereby when said can is manipulated to press said base portion against said surface in a manner to move said stem inwardly to its discharge position, a portion of said product is dispensed into said cavity, said attachment being so arranged that when it is unthreaded from the dispensing stem and inverted, said connecting portion through its other end is able to threadedly engage said dispensing stem in a manner that said attachment is in a storage position over said valve assembly to serve as a closure cap for said apparatus, with said valve assembly being in said forming cavity.

References Cited in the file of this patent

UNITED STATES PATENTS

| | | |
|---|---|---|
| 2,660,132 | Pyenson | Nov. 24, 1953 |
| 2,704,621 | Soffer | Mar. 22, 1955 |
| 2,707,968 | Efford | May 10, 1955 |
| 2,821,048 | Efford et al. | Jan. 28, 1958 |